United States Patent [19]

Ori

[11] Patent Number: 5,963,381
[45] Date of Patent: Oct. 5, 1999

[54] PHOTOGRAPHIC LENS FOR ELECTRONIC STILL CAMERA

[75] Inventor: Tetsuya Ori, Omiya, Japan

[73] Assignee: Fuji Photo Optical Co., Ltd., Saitama, Japan

[21] Appl. No.: 08/997,476

[22] Filed: Dec. 23, 1997

[30]     Foreign Application Priority Data

Feb. 17, 1997  [JP]  Japan .................................. 9-049871

[51] Int. Cl.⁶ ............................................................. G02B 9/60
[52] U.S. Cl. ............................ 359/763; 359/752; 359/761; 359/763; 359/770
[58] Field of Search .................... 359/770, 761, 359/752

[56]             References Cited

U.S. PATENT DOCUMENTS

| | | | |
|---|---|---|---|
| 2,835,168 | 5/1958 | Lange | 359/761 |
| 2,922,337 | 1/1960 | Glatzel | 359/770 |
| 5,589,988 | 12/1996 | Suenaga | 359/761 |
| 5,682,269 | 10/1997 | Kimura et al. | 359/770 |

*Primary Examiner*—Georgia Epps
*Assistant Examiner*—Younggil T. Lee
*Attorney, Agent, or Firm*—Snider & Chao, LLP; Ronald R. Snider

[57]            ABSTRACT

Successively from an object side, a negative lens having a concave surface directed onto an image surface side, a positive meniscus lens having a convex surface directed onto the image surface side, a positive lens having a convex surface directed onto the image surface side, a negative lens having a concave surface directed onto the image surface side, and a biconvex lens are disposed, thereby yielding a photographic lens for electronic still camera which can favorably correct distortion while attaining a compact size and a wide angle of view. Successively disposed from the object side are a negative first lens $L_1$ having a concave surface directed onto the image surface side, a second lens $L_2$ made of a positive meniscus lens having a convex surface directed onto the image surface side, a third lens $L_3$ made of a biconvex lens whose surface with a stronger curvature is directed onto the image surface side, a negative fourth lens $L_4$ having a concave surface directed onto the image surface side, and a fifth lens $L_5$ made of a biconvex lens; while being configured to satisfy the following conditional expressions (1) to (4):

$$0.8 < -f_1/f < 1.2 \qquad (1)$$

$$1.1 < f_3/f < 1.7 \qquad (2)$$

$$1.1 < -f_4/f < 1.5 \qquad (3)$$

$$0.1 < |f/r_3| \qquad (4)$$

4 Claims, 9 Drawing Sheets

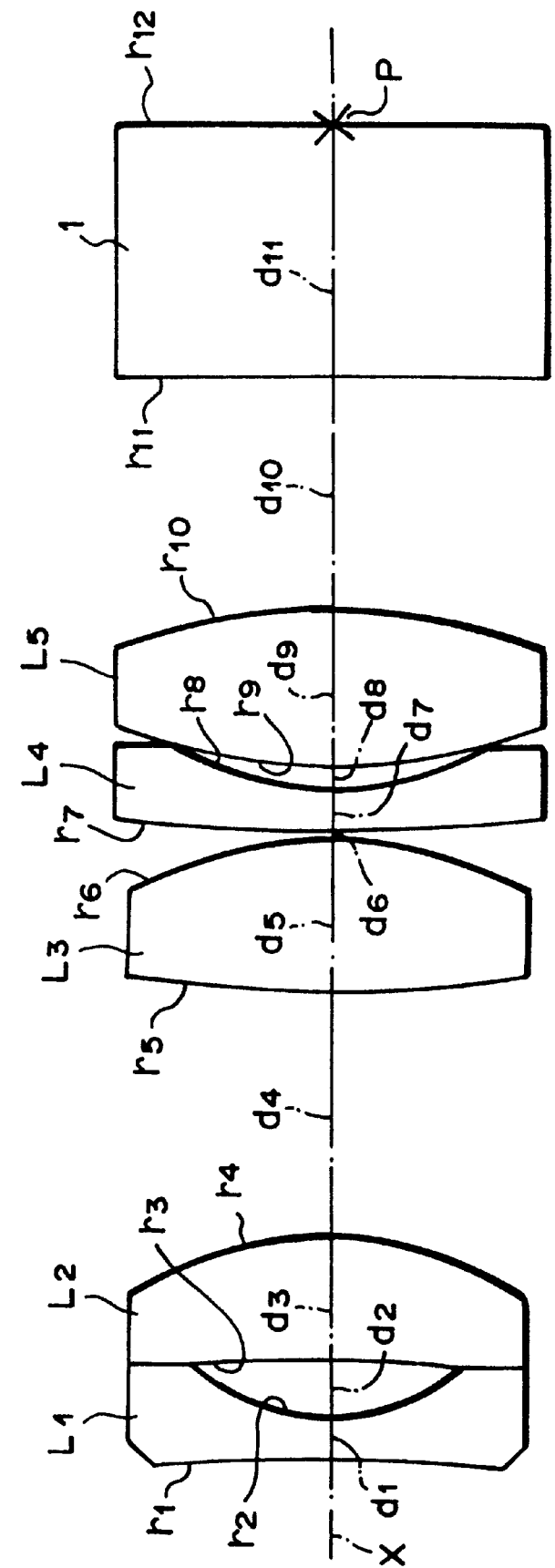
FIG.1 EXAMPLE 1

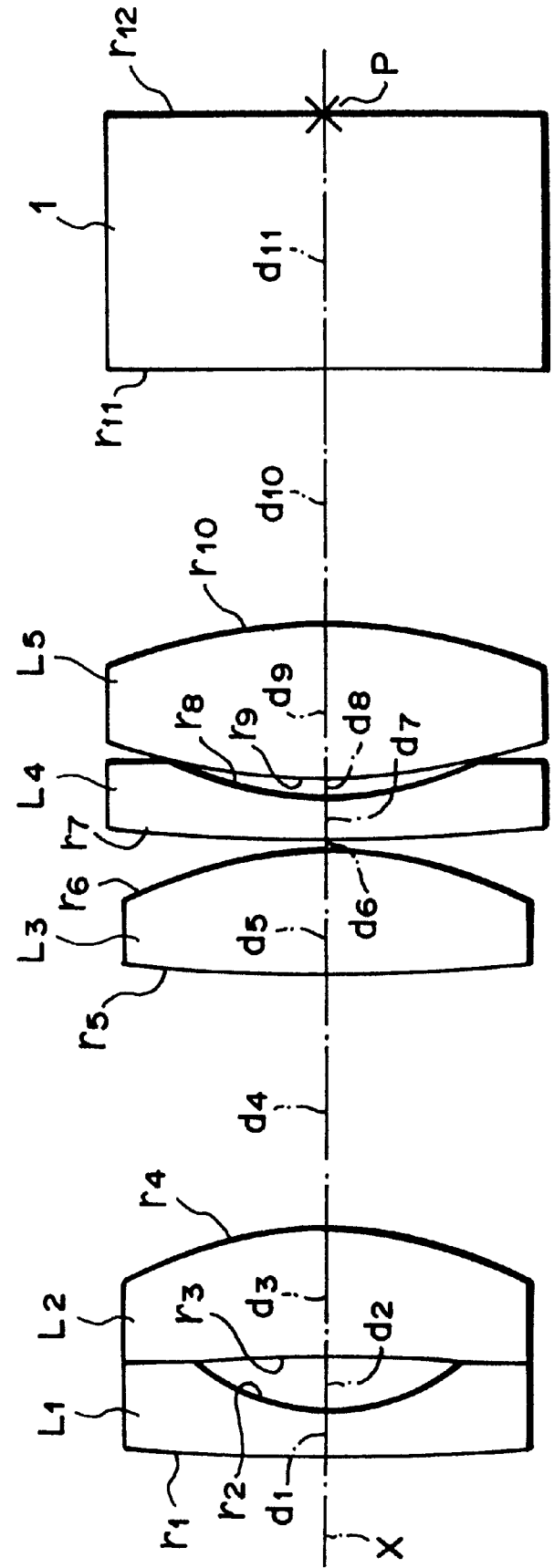
FIG. 2 EXAMPLE 2

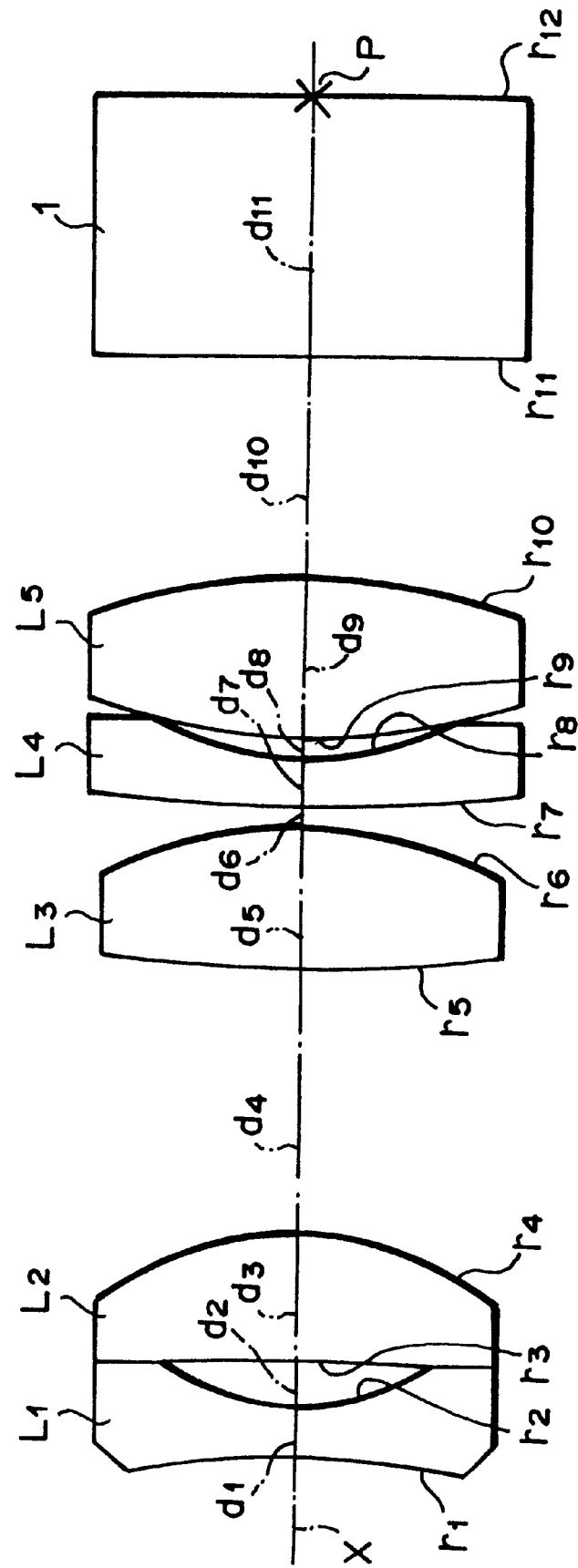
FIG. 3 EXAMPLE 3

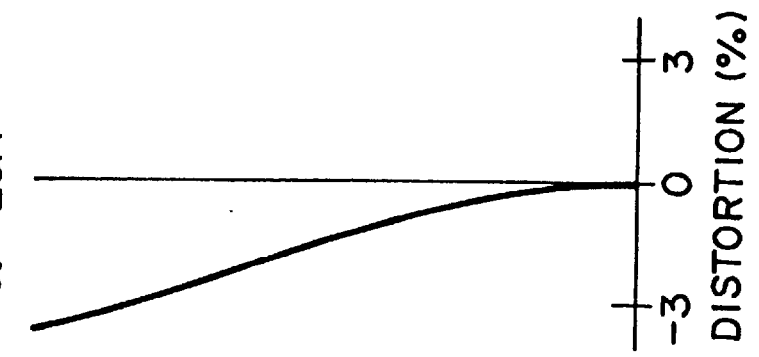
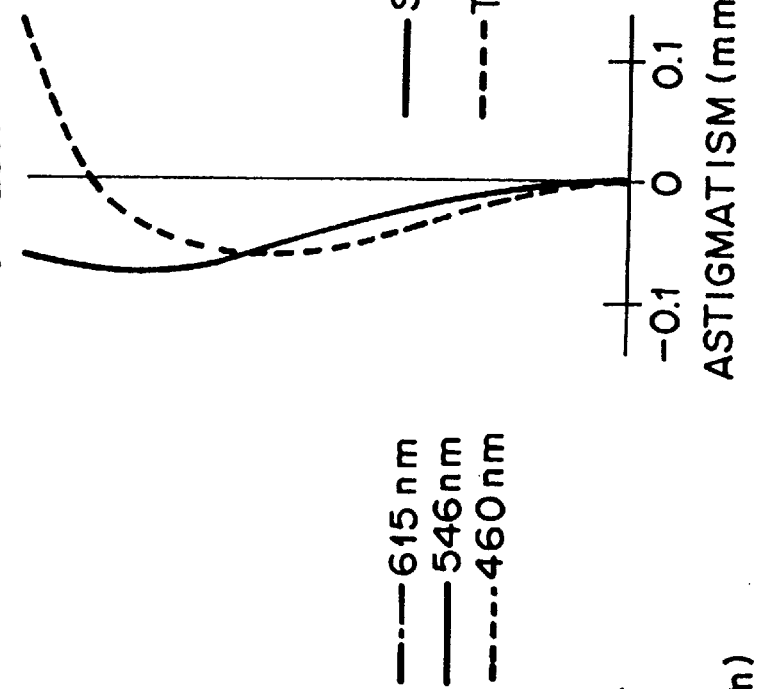
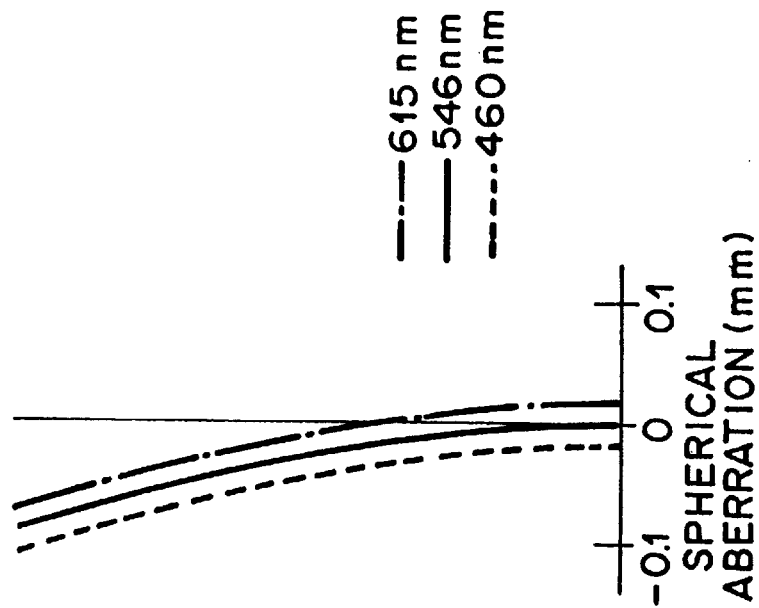

FIG.5
EXAMPLE 1
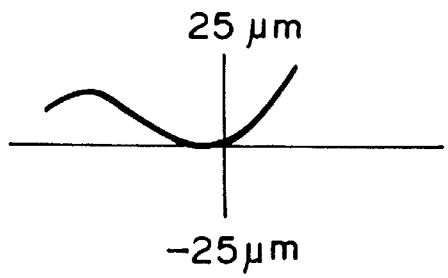
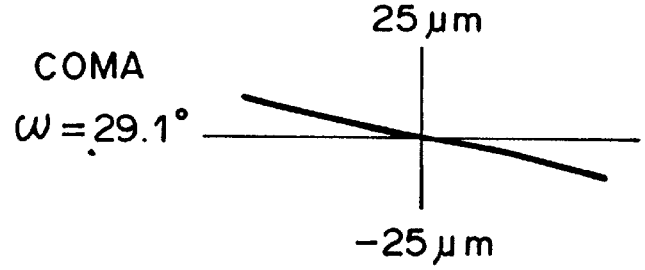
COMA
$\omega = 29.1°$
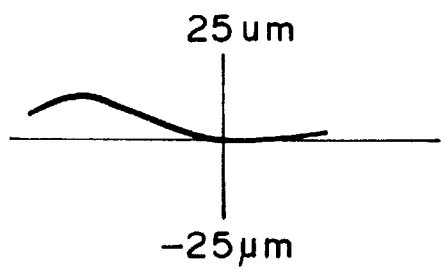
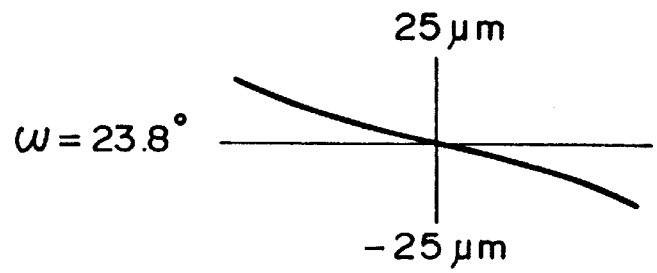
$\omega = 23.8°$
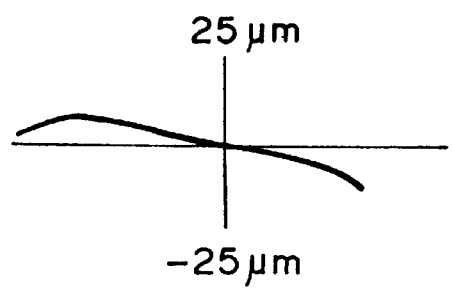
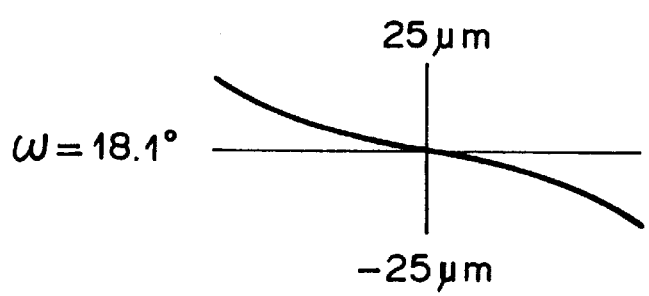
$\omega = 18.1°$
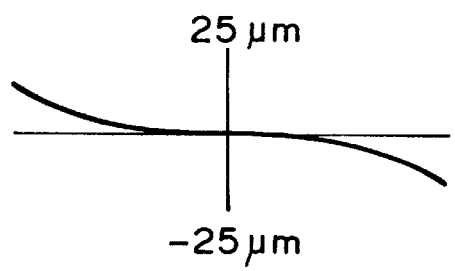
$\omega = 0°$

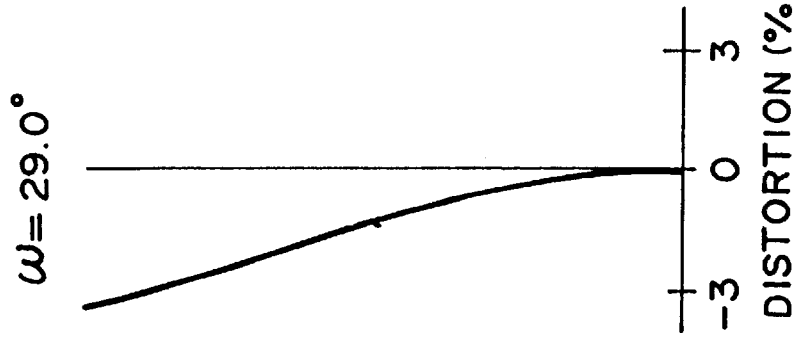
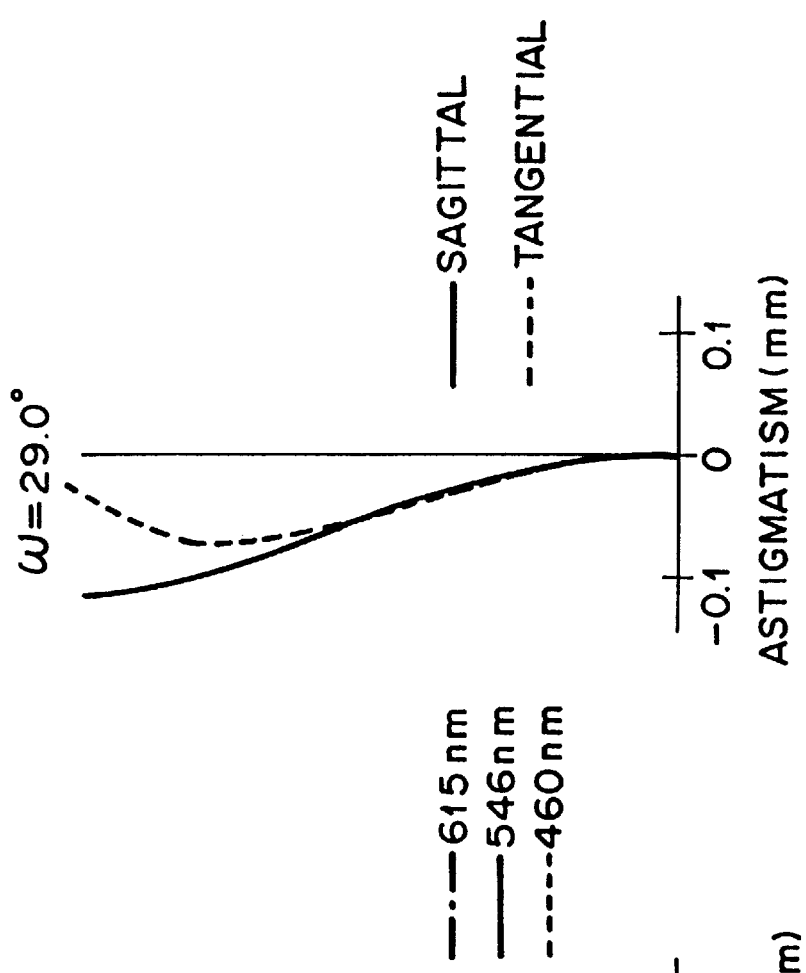
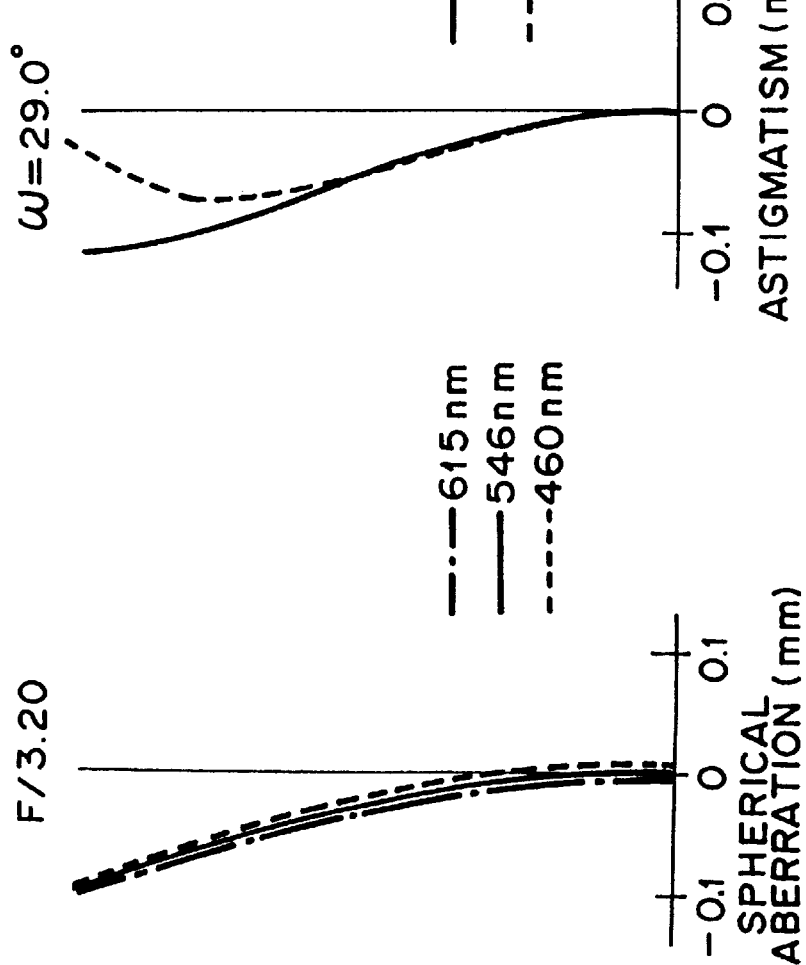

FIG. 7
EXAMPLE 2
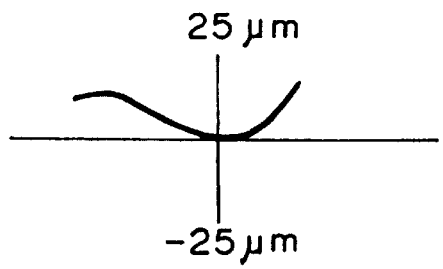
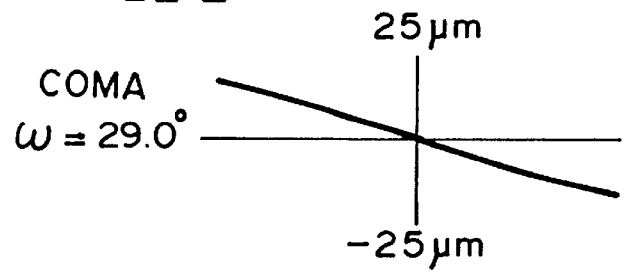
COMA
$\omega = 29.0°$
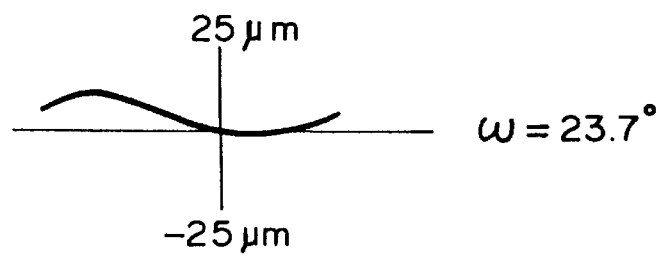
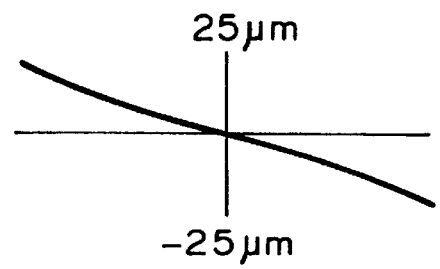
$\omega = 23.7°$
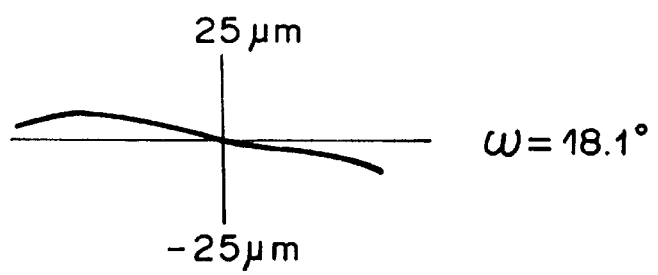
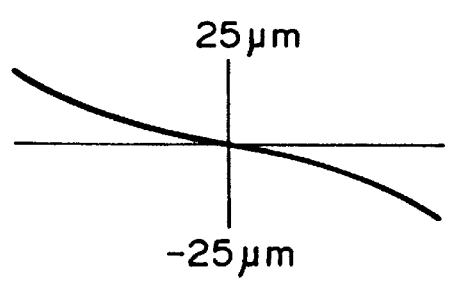
$\omega = 18.1°$
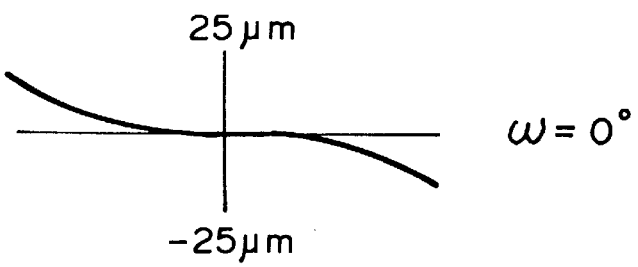
$\omega = 0°$

FIG. 9
EXAMPLE 3
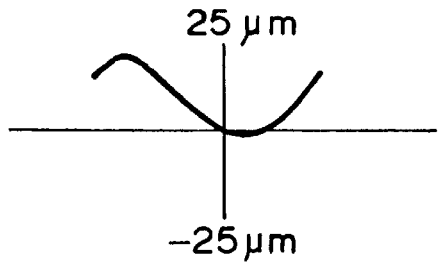
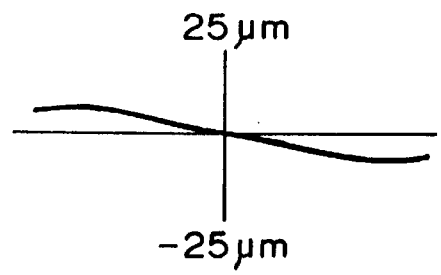
COMA
$\omega = 29°$
$\omega = 23.7°$
$\omega = 18.1°$
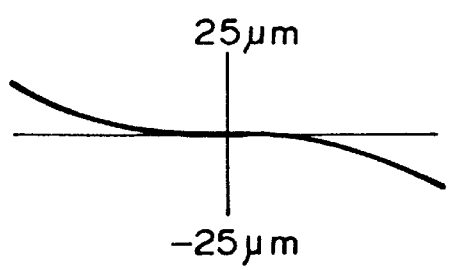
$\omega = 0°$

PHOTOGRAPHIC LENS FOR ELECTRONIC STILL CAMERA

RELATED APPLICATIONS

This application claims the priority of Japanese Patent Application No. 9-49871 filed on Feb. 17, 1997, which is incorporated herein by reference.

BACKGROUND OF THE INVENTION

1. Field of the Invention

The present invention relates to a photographic lens incorporated in an electronic still camera or the like and, in particular, to a compact photographic lens for electronic still camera having a very small total length.

2. Description of the Prior Art

Recently, as personal computers have come into wider use in households and the like, prevailing are electronic still cameras by which image data such as photographed landscapes and portraits can be fed into personal computers.

In order to be incorporated in such an electronic still camera, it is necessary for a photographic lens to be able to attain a very short total lens system length, have a sufficient angle of view, minimize distortion, and so forth. In particular, it is necessary to place a lens system, low-pass filter, and CCD within the thickness of the electronic still camera, and the lens system is required to have a total length not greater than 20 mm, for example. Accordingly, in terms of lens design, the number of lenses is restricted to several sheets, for example.

When a wide angle of view is to be obtained by a small number of lens sheets as mentioned above, distortion may increase, thus making it difficult to attain a practically satisfactory image quality.

SUMMARY OF THE INVENTION

In view of such circumstances, it is an object of the present invention to provide a photographic lens for electronic still camera which can favorably correct distortion while attaining a short total lens system length and a wide angle of view.

The present invention provides a photographic lens for electronic still camera comprising, successively from an object side, a negative first lens having a concave surface directed onto an image surface side, a second lens made of a positive meniscus lens having a convex surface directed onto the image surface side, a positive third lens having a convex surface directed onto the image surface side, a negative fourth lens having a concave surface directed onto the image surface side, and a fifth lens made of a biconvex lens.

Preferably, the photographic lens for electronic still camera is configured so as to satisfy the following conditional expressions (1) to (4):

$$0.8 < -f_1/f < 1.2 \quad (1)$$

$$1.1 < f_3/f < 1.7 \quad (2)$$

$$1.1 < -f_4/f < 1.5 \quad (3)$$

$$0.1 < |f/r_3| \quad (4)$$

wherein f is a focal length of the whole system;
$f_1$ is a focal length of the first lens;
$f_3$ is a focal length of the third lens;
$f_4$ is a focal length of the fourth lens; and
$r_3$ is a radius of curvature of the surface of the second lens on the object side.

Since the photographic lens in accordance with the present invention comprises, as mentioned above, successively from the object side, a negative first lens having a concave surface directed onto the image surface side, a second lens made of a positive meniscus lens having a convex surface directed onto the image surface side, a positive third lens having a convex surface directed onto the image surface side, a negative fourth lens having a concave surface directed onto the image surface side, and a fifth lens made of a biconvex lens; it can favorably correct distortion while attaining a short total lens system length and a wide angle of view.

In this case, it is preferable to satisfy the above-mentioned conditional expressions (1) to (4) because of the following reasons.

Namely, conditional expression (1) relates to power distribution of the first lens. Below its lower limit, back focus becomes so long that a small size may be hard to attain; whereas, beyond its upper limit, Petzval sum increases so much that image surface correction may become difficult.

Conditional expression (2) relates to power distribution of the third lens. Below its lower limit, it becomes difficult to suppress distortion; whereas, beyond its upper limit, back focus becomes so long that a small size may be hard to attain.

Conditional expression (3) relates to power distribution of the fourth lens. Below its lower limit, back focus becomes so long that a small size may be hard to attain; whereas, beyond its upper limit, Petzval sum increases so much that image surface correction may become difficult.

Conditional expression (4) relates to the magnitude of radius of curvature of the surface of the second lens on the object side. Below its lower limit, a ghost image may occur due to reflection at an interface between the air surface and lens surface.

In the photographic lens of the present invention, as these conditional expressions (1) to (4) are satisfied, various kinds of aberration are favorably corrected, while the ghost image can be prevented from occurring.

BRIEF DESCRIPTION OF THE DRAWINGS

FIG. 1 is a lens configurational view showing a photographic lens for electronic still camera in accordance with Example 1 of the present invention;

FIG. 2 is a lens configurational view showing a photographic lens for electronic still camera in accordance with Example 2 of the present invention;

FIG. 3 is a lens configurational view showing a photographic lens for electronic still camera in accordance with Example 3 of the present invention;

FIG. 4A, FIG. 4B and FIG. 4C are aberration charts showing various kinds of aberration (spherical aberration, astigmatism, and distortion) of the photographic lens for electronic still camera in accordance with Example 1 of the present invention;

FIG. 5 is an aberration chart showing coma of the photographic lens for electronic still camera in accordance with Example 1 of the present invention;

FIG. 6A, FIG. 6B and FIG. 6C are aberration charts showing various kinds of aberration (spherical aberration, astigmatism, and distortion) of the photographic lens for electronic still camera in accordance with Example 2 of the present invention;

FIG. 7 is an aberration chart showing coma of the photographic lens for electronic still camera in accordance with Example 2 of the present invention;

FIG. 9 is an aberration chart showing coma of the photographic lens for electronic still camera in accordance with Example 3 of the present invention.

DESCRIPTION OF THE PREFERRED EMBODIMENTS

Figure 8:
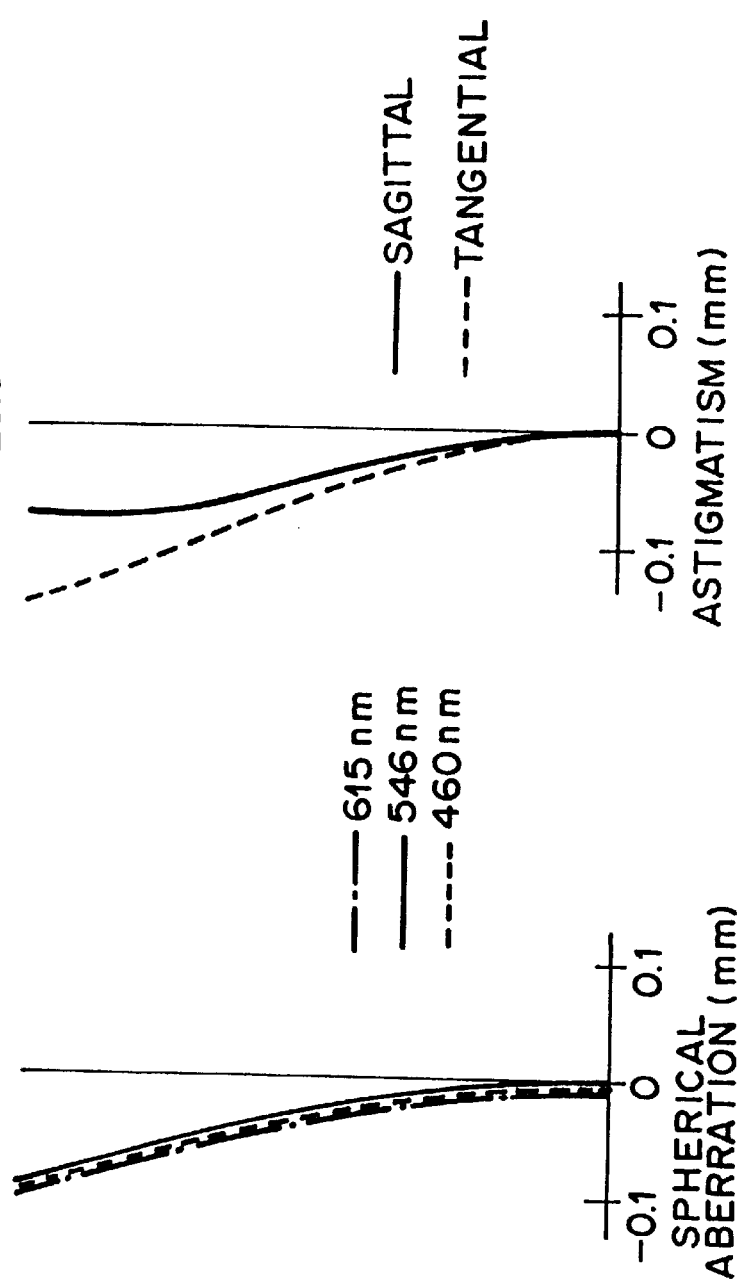
FIG. 8A, FIG. 8B and FIG. 8C are aberration charts showing various kinds of aberration (spherical aberration, astigmatism, and distortion) of the photographic lens for electronic still camera in accordance with Example 3 of the present invention.

In the following, embodiments of the present invention will be explained with reference to specific examples.

FIGS. 1 to 3 are lens configurational views respectively showing photographic lenses for electronic still camera in accordance with Examples 1 to 3 of the present invention.

As depicted, each of these photographic lenses converges a luminous flux carrying object image information incident thereon along an optical axis X from the object side onto a point P on a CCD imaging surface. A photographic lens for electronic still camera is required to be able to favorably correct distortion, and to attain a short total lens system length and a wide angle of view. As a result of the depicted lens configuration, the photographic lens of each example satisfies these requirements.

Namely, the photographic lens of each example comprises, successively from the object side, a negative first lens $L_1$ (biconcave lens and meniscus lens in Examples 1 and 2, respectively) having a concave surface directed onto the image surface side, a second lens $L_2$ made of a positive meniscus lens having a convex surface directed onto the image surface side, a third lens $L_3$ made of a biconvex lens whose surface with a stronger curvature is directed onto the image surface side, a negative fourth lens $L_4$ having a concave surface directed onto the image surface side, and a fifth lens $L_5$ made of a biconvex lens; while being configured to satisfy the following conditional expressions (1) to (4):

$$0.8 < -f_1/f < 1.2 \tag{1}$$

$$1.1 < f_3/f < 1.7 \tag{2}$$

$$1.1 < -f_4/f < 1.5 \tag{3}$$

$$0.1 < |f/r_3| \tag{4}$$

wherein f is a focal length of the whole system;

$f_1$ is a focal length of the first lens;

$f_3$ is a focal length of the third lens;

$f_4$ is a focal length of the fourth lens; and $r_3$ is a radius of curvature of the surface of the second lens on the object side.

Here, a filter block 1 comprising a low-pass filter and the like is disposed between the fifth lens $L_5$ and the CCD imaging surface.

In the following, Examples 1 to 3 of the photographic lens for electronic still camera in accordance with the present invention will be explained individually.

EXAMPLE 1

Table 1 (follows) shows radius of curvature r (mm) of each lens surface, center thickness of each lens and air gap between neighboring lenses (collectively referred to as "axial surface spacing" hereinafter) d (mm), and refractive index $N_d$ and Abbe number $v_d$ of each lens at d-line. The numerals on the left side of Table 1 successively increase from the object side.

Table 2 (follows) shows specific values of $-f_1/f$, $f_3/f$, $-f_4/f$, and $|f/r_3|$ in the respective conditional expressions (1) to (4). Further, the lower part of Table 2 indicates F number (F No), focal length f of the whole system, magnification (β), and half angle of view (ω).

FIGS. 4A, 4B, 4C and 5 are aberration charts showing various kinds of aberration of the photographic lens for electronic still camera in accordance with Example 1.

As can be seen from these charts, this example can yield a photographic lens for electronic still camera having a favorable imaging performance even in the periphery of its field of view.

EXAMPLE 2

Table 3 (follows) shows radius of curvature r (mm) of each lens surface, axial surface spacing d (mm), and refractive index $N_d$ and Abbe number $v_d$ of each lens at d-line. The numerals on the left side of Table 3 successively increase from the object side.

Table 4 (follows) shows specific values of $-f_1/f$, $f_3/f$, $-f_4/f$, and $|f/r_3|$ in the respective conditional expressions (1) to (4). Further, the lower part of Table 4 indicates F number (F No), focal length f of the whole system, magnification (β), and half angle of view (ω).

FIGS. 6A, 6B, 6C and 7 are aberration charts showing various kinds of aberration of the photographic lens for electronic still camera in accordance with Example 2.

As can be seen from these charts, this example can yield a photographic lens for electronic still camera having a favorable imaging performance even in the periphery of its field of view.

EXAMPLE 3

Table 5 (follows) shows radius of curvature r (mm) of each lens surface, axial surface spacing d (mm), and refractive index $N_d$ and Abbe number $v_d$ of each lens at d-line. The numerals on the left side of Table 5 successively increase from the object side.

Table 6 (follows) shows specific values of $-f_1/f$, $f_3/f$, $-f_4/f$, and $|f/r_3|$ in the respective conditional expressions (1) to (4). Further, the lower part of Table 6 indicates F number (F No), focal length f of the whole system, magnification (β), and half angle of view (ω).

FIGS. 8A, 8B, 8C and 9 are aberration charts showing various kinds of aberration of the photographic lens for electronic still camera in accordance with Example 3.

As can be seen from these charts, this example can yield a photographic lens for electronic still camera having a favorable imaging performance even in the periphery of its field of view.

As explained in the foregoing, the photographic lens for electronic still camera in accordance with the present invention can favorably correct distortion while attaining a short total lens system length and a wide angle of view. When this photographic lens is incorporated in an electronic still camera, the latter can attain a compact size and a wide angle of view, and also yield a high-quality image having no distortion even in the periphery of the image.

TABLE 1

| Surface | r | d | $N_d$ | $\nu_d$ |
|---|---|---|---|---|
| 1 | −38.091 | 0.70 | 1.57125 | 56.0 |
| 2 | 3.504 | 0.95 | | |
| 3 | −31.367 | 2.01 | 1.83932 | 37.2 |
| 4 | −5.841 | 4.01 | | |
| 5 | 23.200 | 2.49 | 1.71615 | 53.9 |
| 6 | −6.898 | 0.12 | | |
| 7 | 37.294 | 0.70 | 1.85503 | 23.8 |
| 8 | 5.215 | 0.35 | | |
| 9 | 9.966 | 2.54 | 1.71615 | 53.9 |
| 10 | −9.966 | 3.84 | | |
| 11 | inf | 4.15 | 1.51872 | 64 |
| 12 | inf | | | |

TABLE 2

$-f_1/f = 0.979$
$f_3/f = 1.349$
$-f_4/f = 1.257$
$|f/r_3| = 0.182$

F/3.2   f = 5.7   β = −0.00356   ω = 29°

TABLE 3

| Surface | r | d | $N_d$ | $\nu_d$ |
|---|---|---|---|---|
| 1 | 49.655 | 0.70 | 1.59143 | 60.9 |
| 2 | 3.436 | 0.88 | | |
| 3 | −30.270 | 2.13 | 1.80401 | 42.0 |
| 4 | −6.428 | 4.06 | | |
| 5 | 29.858 | 2.00 | 1.71615 | 53.9 |
| 6 | −7.060 | 0.17 | | |
| 7 | 33.334 | 0.70 | 1.85503 | 23.8 |
| 8 | 5.579 | 0.29 | | |
| 9 | 10.655 | 2.47 | 1.71615 | 53.9 |
| 10 | −9.174 | 4.16 | | |
| 11 | inf | 4.15 | 1.51872 | 64 |
| 12 | inf | | | |

TABLE 4

$-f_1/f = 1.101$
$f_3/f = 1.431$
$-f_4/f = 1.391$
$|f/r_3| = 0.188$

F/3.2   f = 5.7   β = −0.00356   ω = 29°

TABLE 5

| Surface | r | d | $N_d$ | $\nu_d$ |
|---|---|---|---|---|
| 1 | −15.056 | 0.70 | 1.62287 | 60.1 |
| 2 | 3.729 | 0.77 | | |
| 3 | −44.757 | 2.11 | 1.82017 | 46.4 |
| 4 | −5.116 | 4.26 | | |
| 5 | 27.018 | 2.32 | 1.71615 | 53.9 |
| 6 | −6.792 | 0.30 | | |
| 7 | 31.625 | 0.74 | 1.85503 | 23.8 |
| 8 | 5.096 | 0.36 | | |
| 9 | 10.644 | 2.58 | 1.71615 | 53.9 |
| 10 | −9.956 | 3.61 | | |
| 11 | inf | 4.15 | 1.51872 | 64.0 |
| 12 | inf | | | |

TABLE 6

$-f_1/f = 0.830$
$f_3/f = 1.369$
$-f_4/f = 1.263$
$|f/r_3| = 0.127$

F/3.2   f = 5.7   β = −0.00356   ω = 29°

What is claimed is:

1. A photographic lens for electronic still camera comprising successively from an object side, a negative first lens having a concave surface directed onto an image surface side, a second lens made of a positive meniscus lens having a convex surface directed onto the image surface side, a positive third lens having a convex surface directed onto the image surface side, a negative fourth lens having a concave surface directed onto the image surface side, and a fifth lens made of a biconvex lens;

wherein said photographic lens satisfies the following conditional expression (2):

$$1.1 < f_3/f < 1.7 \quad (2)$$

wherein f is a focal length of the whole system; and $f_3$ is a focal length of the third lens.

2. A photographic lens for electronic still camera according to claim 1, wherein said photographic lens satisfies the following conditional expressions (1) (3) and (4):

$$0.8 < -f_1/f < 1.2 \quad (1)$$

$$1.1 < -f_4/f < 1.5 \quad (3)$$

$$0.1 < |f/r_3| \quad (4)$$

wherein $f_1$ is a focal length of the first lens;

$f_4$ is a focal length of the fourth lens; and $r_3$ is a radius of curvature of the surface of the second lens on the object side.

3. A photographic lens for electronic still camera comprising successively from an object side, a negative first lens having a concave surface directed onto an image surface side, a second lens made of a positive meniscus lens having a convex surface directed onto the image surface side, a positive third lens having a convex surface directed onto the image surface side, a negative fourth lens having a concave surface directed onto the image surface side, and a fifth lens made of a biconvex lens;

wherein said photographic lens satisfies the following conditional expression (3):

$$1.1 < -f_4/f < 1.5 \quad (3)$$

wherein f is a focal length of the whole system; and $f_4$ is a focal length of the fourth lens.

4. A photographic lens for electronic still camera in accordance with claim 1;

wherein said photographic lens satisfies the following conditional expression (3):

$$1.1 < -f_4/f < 1.5 \qquad (3)$$

wherein f is a focal length of the whole system; and $f_4$ is a focal length of the fourth lens.

* * * * *